US006514906B1

(12) United States Patent
Hayden

(10) Patent No.: US 6,514,906 B1
(45) Date of Patent: Feb. 4, 2003

(54) CARBONACEOUS CHARS HAVING REDUCED CATALYTIC ACTIVITY

(75) Inventor: Richard A. Hayden, Pittsburgh, PA (US)

(73) Assignee: Calgon Carbon Corporation, Pittsburgh, PA (US)

(*) Notice: Subject to any disclaimer, the term of this patent is extended or adjusted under 35 U.S.C. 154(b) by 0 days.

(21) Appl. No.: 09/078,920

(22) Filed: May 14, 1998

(51) Int. Cl.[7] .............................................. C01B 31/08
(52) U.S. Cl. ................................... 502/416; 423/445 R
(58) Field of Search ................. 502/416, 24; 423/445 R

(56) References Cited

U.S. PATENT DOCUMENTS

| | | | |
|---|---|---|---|
| 2,919,975 A | * 1/1960 | Moore | 203/41 |
| 4,415,478 A | 11/1983 | Suggit et al. | 502/181 |
| 5,466,645 A | * 11/1995 | Hayden | 502/56 |
| 5,470,748 A | 11/1995 | Hayden et al. | 436/37 |
| 5,827,795 A | * 10/1998 | Matviya et al. | 502/180 |

FOREIGN PATENT DOCUMENTS

| | | |
|---|---|---|
| JP | 8047638 | 5/1996 |
| RU | 2072964 | 2/1997 |

* cited by examiner

Primary Examiner—Stuart L. Hendrickson
(74) Attorney, Agent, or Firm—Cohen & Grigsby, P.C.

(57) ABSTRACT

A carbonaceous char is provided having a reduced inherent carbon catalytic activity. The char is derived from one or more of the following: wood, nutshell, fruitstone, peat, lignite, sub-bituminous coal, bituminous coal, semi-anthracite coal, anthracite coal and organic polymers, and has an inherent or "MOD 12" t-¾ time equal to or greater than 125 minutes or a maximum delta T less than or equal to 20° C. The MOD 12 t-¾ time is equal to the elapsed time required for 0.250 grams of said carbonaceous char, pulverized, to decompose from ambient temperature and under adiabatic conditions three-fourths of 0.42 moles of hydrogen peroxide contained in 150 mL of an aqueous solution containing a buffer having a pH of about 12. The maximum delta T is the absolute temperature difference between ambient temperature and the maximum temperature achieved by the hydrogen peroxide decomposition wherein the carbonaceous char has been inertly calcined at temperatures above 700° C. and cooled to ambient temperature under inert conditions prior to measurement of the MOD 12 t-¾ time and the maximum delta T.

1 Claim, No Drawings

CARBONACEOUS CHARS HAVING REDUCED CATALYTIC ACTIVITY

FIELD OF THE INVENTION

The present invention relates to a carbonaceous char having reduced catalytic activity for the decomposition of hydrogen peroxide and other materials susceptible to catalytic chemical conversion in the presence of the char.

BACKGROUND OF THE INVENTION

Carbonaceous chars such as activated carbons, especially those produced at high temperatures (i.e., above 700° C.), often possess catalytic properties which may interfere with their use in certain applications. The origins of this catalytic activity can usually be attributed to two principal factors: (1) the inorganic non-carbon ash constituents of the char, e.g. iron, potassium, and calcium, and (2) the inherent catalytic properties of the carbon itself. If the char is used for the adsorption, removal, and/or recovery of substances from fluid streams, the presence of catalytic reactivity in the char may lead to an unwanted chemical conversion of one or more of the stream components into materials that contaminate the final process stream, interfere with the physical adsorption of the other stream components, or interfere with other intended functions of the char or stream components. Moreover, the reactions which lead to such catalytic chemical conversion are often highly exothermic, increasing the likelihood of ignition of the char itself under some conditions.

Examples of processes in which the catalytic reactivity of the char is a liability include the purification or use of reactive or oxidizable products such as hydrogen peroxide and organic glycols, and the adsorption, recovery, and re-use of reactive or oxidizable solvents such as acetone and methyl ethyl ketone. In these types of applications, the component of the stream with the highest utility is itself a material which can be decomposed or chemically converted if catalyzed by the carbon under certain conditions. In other applications it may be desirable to preserve a reactive constituent of the process stream, e.g. hydrogen peroxide, such that it is available for reaction with species other than the carbon itself. Removal of the catalytic properties of the carbon would allow more of such components to exist for their intended function. Less obvious is the need for a non-catalytic, adsorptive carbon for applications in which the potentially reactive component is an interference, constituting only a small part of the adsorbate loading. For example, in streams containing small concentrations of an oxidizable material such as hydrogen sulfide and much higher concentrations of an adsorbable, recoverable, and re-usable organic, it is possible that the oxidation of the hydrogen sulfide, which is only weakly physically adsorbed per se, can cause a build-up over time of highly adsorbable and polar reaction products, such as sulfuric acid, which can greatly interfere with the adsorption of the organic components of the stream. If the inherently reactive carbon catalytic sites can be deactivated, maximum use can be made of the physical adsorption properties of the carbon for the removal and recovery of the organic stream components.

Prior art methods to reduce the catalytic reactivity of carbonaceous chars have been directed almost exclusively to the removal or deactivation of catalytically-active ash constituents which may be present in the char. For example, it is well known to remove acid-soluble ash constituents by acid-washing of the char. After treatment, the char is invariably rinsed with water and/or an aqueous solution of a base to remove and/or neutralize the acid. Hydrofluoric acid solution, an extremely hazardous material, has been found to be particularly effective for removing such ash components. Ash reductions exceeding an order of magnitude are usually achievable by these methods. Other ash removal processes treat the char first with caustic solution to remove caustic-soluble components, followed by the aforementioned acid extraction treatment to remove the remaining acid-soluble components. In other embodiments of the art, the ash components are treated with agents such as silanes to reduce their catalytic reactivity without removing them from the carbon surface. In all of these prior art methods, however, little regard has been given to the inherent catalytic activity of the carbon itself, which alone may be sufficient to interfere with the intended function of the char.

Where the reactivity of the carbon has been considered, no methods have been identified or reported which can deactivate the carbon effectively and largely irreversibly. For example, it has been observed that oxygen can chemisorb to the carbon surface and cause the carbon to become less catalytically active. However, after use, and upon high-temperature thermal treatment of the char to remove other adsorbed materials, it is found that the oxygen is also lost from the carbon. Upon removal of the oxygen, an increase in the inherent catalytic activity of the carbon once again becomes manifest, requiring additional post-treatment of the thermally-treated char to deactivate the carbon prior to re-use. Therefore, the oxygen appears to have merely masked, and not destroyed, the reactivity of the carbon.

Accordingly, it is the object of the present invention to provide a carbonaceous char having reduced inherent catalytic activity for use in those applications where the inherent catalytic reactivity of the carbon is a concern. It is further the object of the present invention to provide a carbonaceous char having reduced catalytic activity wherein said reduced activity is largely unaffected by exposure to high-temperatures and is, in fact, enabled by such temperatures.

SUMMARY OF THE INVENTION

Generally, the present invention comprises a carbonaceous char having an inherent carbon catalytic activity which is greatly reduced when compared to chars of the prior art derived from wood, nutshell, fruitstone, peat, lignite, sub-bituminous coal, bituminous coal, semi-anthracite coal, anthracite coal, or synthetic polymers. Moreover, the reduced inherent catalytic activity provided by such chars is largely irreversible upon high-temperature thermal treatment of the char.

In a preferred embodiment of the invention, such chars are prepared by first contacting a char with a non-nitrogen-containing Bronsted acid, such as hydrochloric acid, at temperatures at or below the boiling point of the acid or aqueous acid solution. Thereafter, the treated char is heated to a temperature above 750° C. Nitrogen-containing acids such as nitric acid are known to increase the inherent catalytic activity of carbonaceous chars under some treatment conditions and are, therefore, not generally preferred in the preferred embodiment of the present invention. The amounts of acid used in the preferred embodiment are such that the carbon contains preferably 1-10 millimoles of acid hydrogen per mole of carbon prior to raising the temperature of the acid-containing carbon to or above 750° C. It may also be desirable to use such acid to reduce any non-carbon contributions to the overall catalytic activity of the char. This is not necessary for those applications requiring only the deactivation of the inherent catalytic activity of the carbon itself.

If the char is rinsed with water following acid treatment, the rinse is preferably carried out so that the pH of the rinse water is less than 5, preferably less than 1, to ensure that sufficient acid is present on the char to achieve the required deactivation of the catalytic carbon sites upon raising the temperature. Upon exposure of the acid-containing char to temperatures equal to or greater than 750° C., the deactivation of the carbon reactivity is largely effected. Heating the acid-containing carbon is carried out preferably in an inert or oxygen-free atmosphere, while cooling the deactivated char to ambient temperatures is preferably carried out in an oxygen-containing atmosphere to impart additional, reversible deactivation properties to the char according to the methods of known prior art. Other prior art methods for deactivating other reactive elements of the char may be used in practicing the method of the present invention to impart still other desirable properties to the deactivated char. For example, for chars containing high levels of catalytically-active inorganic ash constituents, the ash components may be removed with base and/or acid after, as well as prior to, application of the method of the present invention.

The methods of the presently preferred embodiment may be repeated any number of times to the same char to achieve additional levels of deactivation. However, for chars with comparatively low levels of initial inherent carbon reactivity, a single application of the method is generally sufficient to achieve the carbonaceous char of the present invention. Advantages of the chars of the present invention will become apparent from a perusal of the following detailed description of presently preferred embodiments of the invention.

PRESENTLY PREFERRED EMBODIMENTS

The following examples illustrate the preferred embodiments of the present invention. In these examples, a peroxide decomposition reaction is used as the primary measure of the reactivity of the carbon. This reaction is represented numerically by the t-¾ time as described in Example 1 of U.S. Pat. No. 5,470,748, which is incorporated by reference herein, the sole exception residing in the choice of the aqueous buffer solution. In the present invention this solution has a pH of approximately 12 and is 0.5 molar in $K_2HPO_4$ and 0.5 molar in $K_3PO_4$. The use of a high pH buffer allows more convenient measurement and ranking of the catalytic properties of carbonaceous chars having exceptionally low catalytic activities. Also determined in the modified test of the present invention is the maximum delta T, measured in ° C. The maximum delta T is the absolute temperature difference between ambient temperature and the maximum temperature achieved during the peroxide decomposition reaction used to measure the t-¾ time. Determining the maximum delta T allows an additional measure by which chars with exceptionally low catalytic reactivities may be compared.

Two different measures of the t-¾ are also distinguished in the present invention, depending on the prior history of the char: an apparent t-¾ time and an inherent t-¾ time as measured by the MOD 12 t-¾ time. The apparent t-¾ time refers to the peroxide decomposition tendencies of the carbon as received, which may reflect masking of the peroxide-active sites by chemisorbed oxygen or by other physisorbed species. The MOD 12 t-¾ time refers to the peroxide decomposition tendencies of the carbon just after inert calcination at temperatures above 700° C., preferably the temperature at which the carbon was prepared, followed by cooling to ambient temperatures under inert conditions. Although most chars will again begin to sorb oxygen after calcination upon their exposure to ambient air at ambient temperatures and pressures, the effects of this oxygen are negligible if the t-¾ time is measured within a few days after calcination, or if the calcined char is stored under dry and/or inert conditions. By this calcination procedure, materials that deactivate the peroxide-active sites by masking are largely removed, revealing more nearly the maximum peroxide decomposition tendencies inherent in the carbon and allowing direct comparisons of the inherent catalytic activities among different chars. In general, this MOD 12 t-¾ time is found to be less than or equal to the apparent t-¾ time. In a preferred embodiment of the present invention, the char has a MOD 12 t-¾ time equal to or greater than 125 minutes or a maximum delta T less than or equal to 20° C., wherein the MOD 12 t-¾ time is equal to the elapsed time required for 0.250 grams of the char, pulverized, to decompose from ambient temperature and under adiabatic conditions three fourths of 0.42 moles of $H_2O_2$ contained in 150 mL of an aqueous solution having a pH of about 12, and wherein the maximum delta T is the absolute temperature difference between ambient temperature and the maximum temperature achieved by said $H_2O_2$ decomposition, said carbonaceous char having been inertly calcined at temperatures above 700° C. and cooled to ambient temperature under inert conditions prior to measurement of the MOD 12 t-¾ time and maximum delta T. When determined in this manner, the MOD 12 t-¾ time and maximum delta T serve as measures of inherent catalytic activity of the char.

Example 1 provides a representation of the apparent and mod 12 t-¾ times and corresponding maximum delta Ts of a number of prior art carbons. In this example it is seen that the mod 12 t-¾ time of the carbon is usually significantly less than the apparent t-¾ time. In no case was an mod 12 t-¾ time or a corresponding maximum delta T observed that was equal to or greater than 105 minutes or less than or equal to 24° C., respectively.

Examples 2,3, and 4 provide representations of the MOD 12 t-¾ times and corresponding maximum delta Ts of a preferred embodiment of the present invention. In these examples it is seen that the calcination of the carbon to provide the deactivation of the catalytic activity also enables measurement of the mod 12 t-¾ time of the carbon. Comparison of the MOD 12 t-¾ times and maximum delta Ts of Examples 2,3, and 4 to those of Example 1 shows that much lower inherent catalytic activities (i.e., higher mod 12 t-¾ times and lower maximum delta Ts) are afforded by the carbonaceous chars of the present invention. Moreover, the MOD 12 t-¾ times are not decreased by exposure of the carbon to high temperatures, but are, in fact, enabled by the treatment.

EXAMPLE 1.

The t-¾ times of samples of commercially-manufactured activated carbons A (wood-based granular), B (wood-based pellet), C (peat-based granular), D (coconut-based granular), E (lignite-based granular), F (anthracite-based pellet), G (bituminous coal-based pellet), H (wood-based pellet), I (sub-bituminous coal-based granular), J (peat-based pellet), K (lignite-based granular), L (peat-based pellet), M (coconut-based pellet), and N (bituminous coal-based granular) were measured, as received, by the method described in Example 1 of U.S. Pat. No. 5,470,748, the sole exception residing in the choice of buffer solution which in the present invention comprised 50 mL of a solution having a pH of approximately 12. This solution was prepared by combining equal volumes of a 1 M $K_2HPO_4$ solution and a 1 M $K_3PO_4$ solution. In addition to the t-¾ time, the maximum delta T was also measured. The maximum delta T is defined as the maximum absolute temperature difference between ambient temperature and the maximum temperature attained during measurement of the t-¾ time. When tested by this method, the apparent t-¾ times and corresponding maximum delta Ts of these carbons, as received, were as given in Table 1.

Representative 25 gram portions of each of these carbons were then calcined under nitrogen for about 30 minutes at about 925° C. and then cooled to ambient temperature under nitrogen. When tested by the method given above, the MOD 12 t-¾ times and maximum delta Ts of these carbons, after inert calcination, were as given also in Table 1.

EXAMPLE 2.

Representative 25 gram portions of carbons A, B, C, D, E, F, G, and H described in Example 1, as received, were oven-dried in air at about 150° C. for about 4 hours, and then cooled in air to ambient temperature, to remove any residual moisture which the carbons may have adsorbed during storage. The carbons were then deactivated in the following manner:

Approximately 15 mL of a 10 N aqueous hydrochloric acid solution was impregnated onto each of the oven-dried carbons, which were then allowed to stand for about 24 hours in closed glass containers at ambient temperature. Following this treatment, the containers and their contents were directly oven-dried in air at about 150° C. and at atmospheric pressure for about 24 hours, and then cooled to ambient temperature in air. Following this treatment, the hydrochloric acid-treated, oven-dried carbons were calcined under nitrogen for about 30 minutes at about 925° C. and then cooled to ambient temperatures under nitrogen. The MOD 12 t-¾ times of the carbons resulting from this treatment were then measured by the method described above in Example 1. When tested in this manner, the mod 12 t-¾ times and maximum delta Ts of the deactivated carbons were as given in Table 1.

EXAMPLE 3.

Representative 25 gram portions of carbons I and J described in Example 1, as received, were oven-dried in air at about 150° C. for about 4 hours, and then cooled in air to ambient temperature, to remove any residual moisture which the carbons may have adsorbed during storage. The carbons were then deactivated in the following manner:

Approximately 15 mL of a 5 N aqueous hydrobromic acid solution was impregnated onto each of the oven-dried carbons, which were then allowed to stand for about 24 hours in closed glass containers at ambient temperature. Following this treatment, the containers and their contents were directly oven-dried in air at about 150° C. and at atmospheric pressure for about 24 hours, and then cooled to ambient temperature in air. Following this treatment, the hydrobromic acid-treated, oven-dried carbons were calcined under nitrogen for about 30 minutes at about 925° C. and then cooled to ambient temperatures under nitrogen. The mod 12 t-¾ times of the carbons resulting from this treatment were then measured by the method described above in Example 1. When tested in this manner, the MOD 12 t-¾ times and maximum delta Ts of the deactivated carbons were as given in Table 1.

EXAMPLE 4.

Representative 25 gram portions of carbons K, L, M, and N described in Example 1, as received, were oven-dried in air at about 150° C. for about 4 hours, and then cooled in air to ambient temperature, to remove any residual moisture which the carbons may have adsorbed during storage. The carbons were then deactivated in the following manner:

Approximately 15 mL of a 5 N aqueous hydrobromic acid solution was impregnated onto each of the oven-dried carbons, which were then allowed to stand for about 24 hours in closed glass containers at ambient temperature. Following this treatment, the containers and their contents were directly oven-dried in air at about 150° C. and at atmospheric pressure for about 24 hours, and then cooled to ambient temperature in air. Following this treatment, the hydrobromic acid-treated, oven-dried carbons were calcined under nitrogen for about 30 minutes at about 925° C. and then cooled to ambient temperatures under nitrogen.

Following this treatment, 10 gram portions of the resultant carbons were impregnated with approximately 6 mL of a 5 N aqueous hydrobromic acid solution. The impregnated carbons were then allowed to stand for at least 24 hours in closed glass containers at ambient temperature. Following this treatment, the containers and their contents were directly oven-dried in air at about 150° C. and at atmospheric pressure for about 24 hours, and then cooled to ambient temperature in air. Following this treatment, the hydrobromic acid-treated, oven-dried carbons were calcined under nitrogen for about 30 minutes at about 925° C. and then cooled to ambient temperatures under nitrogen. The MOD 12 t-¾ times of the carbons resulting from this treatment were then measured by the method described above in Example 1. When tested in this manner, the MOD 12 t-¾ times and maximum delta Ts of the deactivated carbons were as given in Table 1.

TABLE 1

|  |  | t-¾ time (minutes) maximum delta T (° C.) | |
| --- | --- | --- | --- |
|  |  | Prior Art | Present Invention |
| Carbon | Acid | Apparent / MOD 12 | MOD 12 |
| A Hydrochloric Acid (wood) granular | | 126 Min. {27° C.} / 93 Min. {27° C.} | 149 Min. {7° C.} |
| B Hydrochloric Acid (wood) pellet | | 160 Min. {23° C.} / 104 Min. {25° C.} | 204 Min. {15° C.} |
| C Hydrochloric Acid (peat) granular | | 19 Min. {37° C.} / 25 Min. {35° C.} | 130 Min. {13° C.} |
| D Hydrochloric Acid (coconut) granular | | 78 Min. {31° C.} / 70 Min. {31° C.} | 151 Min. {23° C.} |
| E Hydrochloric Acid (lignite) granular | | 29 Min. {37° C.} / 77 Min. {30° C.} | 129 Min. {13° C.} |
| F Hydrochloric Acid (anthracite) pellet | | 39 Min. {36° C.} / 11 Min. {39° C.} | 182 Min. {18° C.} |
| G Hydrochloric Acid (bituminous) pellet | | 9 Min. {39° C.} / 7 Min. {39° C.} | 199 Min. {14° C.} |
| H Hydrochloric Acid (wood) pellet | | 56 Min. {33° C.} / 51 Min. {32° C.} | 98 Min. {6° C.} |
| I Hydrochloric Acid (subbituminous) granular | | 5 Min. {40° C.} / 3 Min. {40° C.} | 168 Min. {13° C.} |
| J Hydrochloric Acid (peat) pellet | | 8 Min. {39° C.} / 4 Min. {39° C.} | 169 Min. {12° C.} |
| K Hydrochloric Acid | | 30 Min. / 16 Min. | 182 Min. |

TABLE 1-continued

| | t-¾ time (minutes) maximum delta T (° C.) | | |
|---|---|---|---|
| | Prior Art | | Present Invention |
| Carbon Acid | Apparent | MOD 12 | MOD 12 |
| (lignite) granular | {35° C.} | {36° C.} | {9° C.} |
| L Hydrochloric Acid (peat) pellet | 5 Min. {39° C.} | 4 Min. {40° C.} | 185 Min. {19° C.} |
| M Hydrochloric Acid (coconut) pellet | 18 Min. {36° C.} | 9 Min. {38° C.} | 218 Min. {18° C.} |
| N Hydrochloric Acid (bituminous) granular | 6 Min. {40° C.} | 5 Min. {40° C.} | 159 Min. {15° C.} |

What is claimed is:

1. A carbonaceous char, derived from at least one selected from the group consisting of wood, nutshell, fruitstone, peat, lignite, sub-bituminous coal, bituminous coal, semi-anthracite coal, anthracite coal, and organic polymers, having a MOD 12 t-¾ time equal to or greater than 125 minutes or a maximum delta T less than or equal to 20° C., wherein said MOD 12 t-¾ time is equal to the elapsed time required for 0.250 grams of said carbonaceous char, pulverized, to decompose from ambient temperature and under adiabatic conditions three-fourths of 0.42 moles of hydrogen peroxide contained in 150 mL of an aqueous solution containing a buffer having a pH of about 12, and wherein said maximum delta T is the absolute temperature difference between ambient temperature and the maximum temperature achieved by said hydrogen peroxide decomposition, said carbonaceous char having been inertly calcined at temperatures above 700° C. and cooled to ambient temperature under inert conditions prior to measurement of said MOD 12 t-¾ time and said maximum delta T.

* * * * *